(12) United States Patent
Dong

(10) Patent No.: US 8,369,714 B2
(45) Date of Patent: Feb. 5, 2013

(54) BURST OPTICAL SIGNAL RECEIVING DEVICE

(75) Inventor: Ke Dong, Chengdu (CN)

(73) Assignee: Superxon (Chengdu) Technology Ltd., Sichuan, Chengdu (CN)

( * ) Notice: Subject to any disclaimer, the term of this patent is extended or adjusted under 35 U.S.C. 154(b) by 247 days.

(21) Appl. No.: 12/918,381

(22) PCT Filed: Aug. 16, 2010

(86) PCT No.: PCT/CN2010/076021
§ 371 (c)(1),
(2), (4) Date: Aug. 19, 2010

(87) PCT Pub. No.: WO2012/016388
PCT Pub. Date: Feb. 9, 2012

(65) Prior Publication Data
US 2012/0033980 A1  Feb. 9, 2012

(30) Foreign Application Priority Data
Aug. 4, 2010 (CN) .......................... 2010 1 0244845

(51) Int. Cl.
*H04B 10/06* (2006.01)
(52) U.S. Cl. ........ 398/202; 398/208; 398/209; 398/210; 398/135; 398/136; 250/214 A; 250/214 AG; 330/59; 330/308; 375/317; 375/319; 375/316

(58) Field of Classification Search .................. 398/202, 398/208, 209, 135, 136, 137, 138, 139, 210, 398/214, 164, 158, 159; 250/214 A, 214 AG, 250/214 LA, 214 RC; 330/59, 308; 375/316, 375/317, 318, 319
See application file for complete search history.

(56) References Cited

U.S. PATENT DOCUMENTS

| 2006/0120732 A1* | 6/2006 | Baek et al. ..................... 398/202 |
| 2008/0080871 A1* | 4/2008 | Yao et al. ...................... 398/164 |
| 2009/0028581 A1* | 1/2009 | Duanmu et al. .............. 398/202 |
| 2010/0254711 A1* | 10/2010 | Miller ........................... 398/136 |

* cited by examiner

*Primary Examiner* — Hanh Phan
(74) *Attorney, Agent, or Firm* — Morgan, Lewis & Bockius LLP

(57) ABSTRACT

A burst optical signal receiving device is provided, which includes an optical receiving component and a limiting amplifying circuit unit. The optical receiving component further includes a photodetector, a trans-impedance amplifier, a first direct current (DC) cancellation forbidding circuit, and a DC bias circuit, and the limiting amplifying circuit unit further includes a group of alternating current (AC) coupling capacitors, a limiting amplifier, and a second DC cancellation forbidding circuit. Through the technical solution, an input burst optical signal within a certain dynamic range can be recovered into a valid burst electric signal in shorter time. The technical solution can be applied in a burst optical signal receiver in a 10-Gigabit Ethernet passive optical network (10GEPON).

10 Claims, 2 Drawing Sheets

BURST OPTICAL SIGNAL RECEIVING DEVICE

CROSS REFERENCE TO RELATED APPLICATIONS

This Application is a United States National Stage Application filed under 35 U.S.C. §371 of PCT Patent Application Serial No. PCT/CN2010/076021 filed on Aug. 16, 2010, which claims the benefit of and priority to Chinese Patent Application Serial No. 201010244845.7 filed on Aug. 4, 2010, both of which are hereby incorporated by reference in their entireties.

BACKGROUND OF THE INVENTION

1. Field of the Invention

The present invention relates to the field of optical communication technology, and more particularly to a burst optical signal receiving device.

2. Background of the Invention

An optical communication apparatus is usually required to receive a burst optical signal, so that an optical communication physical layer circuit needs to recover the burst electric signal in shorter time, thus difficulties are brought to the practical circuit design.

The contradiction is particularly prominent in a burst optical signal receiver of an optical transceiver module of an optical line terminal in a 10-Gigabit Ethernet passive optical network (10GEPON). An optical receiving circuit of the optical transceiver module of the optical line terminal in the 10GEPON needs to receive a burst transmitter optical signal at a rate of 10.3125 Gbps from an optical network unit.

An Institute of Electrical and Electronics Engineers (IEEE) 10GEPON draft (IEEE P802.3av™/D3.4, on Jun. 18, 2009) requires that the optical transceiver module of the optical line terminal recovers the burst transmitter optical signal at the rate of 10.3125 Gbps from the optical network unit into a valid electric signal within 800 nanoseconds, and requires that an optical power saturation point is higher than −6 dBm, and a sensitivity is higher than −28 dBm (a corresponding bit error rate is smaller than $10^{-3}$).

Currently, no mature chip solution can be applied to receiving the burst optical signal at the rate of 10.3125 Gbps, while an optical signal receiving chip in a point-to-point optical communication system at a rate of 10 G can only be applied to receiving continuous and stable optical signals, which cannot satisfy the requirement of the IEEE 10GEPON draft on the receiving of the burst optical signal.

In the present invention, by utilizing an optical signal receiving chip in an existing point-to-point optical communication system, working characteristics are changed through a peripheral self-built circuit, data recovery time is shortened, and a dynamic working range of an input optical signal is widened, so as to basically satisfy the requirement of the IEEE 10GEPON draft on the receiving of the burst optical signal.

SUMMARY OF THE INVENTION

Accordingly, the present invention is directed to a burst optical signal receiving device, capable of recovering an input burst optical signal within a certain dynamic range into a usable burst electric signal in shorter time.

In order to achieve the objective, the present invention provides a burst optical signal receiving device, which includes a photodetector, a trans-impedance amplifier having an enabling input end of a direct current (DC) cancellation function and a DC bias input end, a group of alternating current (AC) coupling capacitors, and a limiting amplifier.

An output end of the photodetector is connected with an input end of the trans-impedance amplifier; the enabling input end of the DC cancellation function of the trans-impedance amplifier is set to that a DC cancellation function is forbidden; the DC bias input end of the trans-impedance amplifier is grounded through a resistor; one end of the AC coupling capacitor is connected with an output end of the trans-impedance amplifier respectively; the other end of the AC coupling capacitor is connected with two input ends of the limiting amplifier respectively; and an output end of the limiting amplifier outputs a burst differential voltage signal.

The photodetector is a photo diode, and is preferably an avalanche photo diode.

A difference between a DC bias current value set by a DC bias circuit and a current value of a start end of a linear amplifying region of the trans-impedance amplifier does not exceed 0.5 mA.

The group of AC coupling capacitors has 2 capacitors. A capacitance value of each capacitor is greater than 100 pF and smaller than 4.7 nF.

A resistance value of the resistor is smaller than 10 kΩ.

A connection manner of setting the enabling input end of the DC cancellation function of the trans-impedance amplifier to that the DC cancellation function is forbidden is to ground the enabling input end of the DC cancellation function.

The limiting amplifier amplifies an AC signal and a DC signal simultaneously. The limiting amplifier has an enabling input end of a DC cancellation function, and the enabling input end of the DC cancellation function is set to that a DC cancellation function is forbidden.

The burst optical signal receiving device according to the present invention is capable of recovering an input burst optical signal within a certain dynamic range into a valid burst electric signal in shorter time.

DETAILED DESCRIPTION OF THE INVENTION

The technical solution according to the present invention is further illustrated hereinafter in combination with accompanying drawings and an embodiment.

Figure 1:
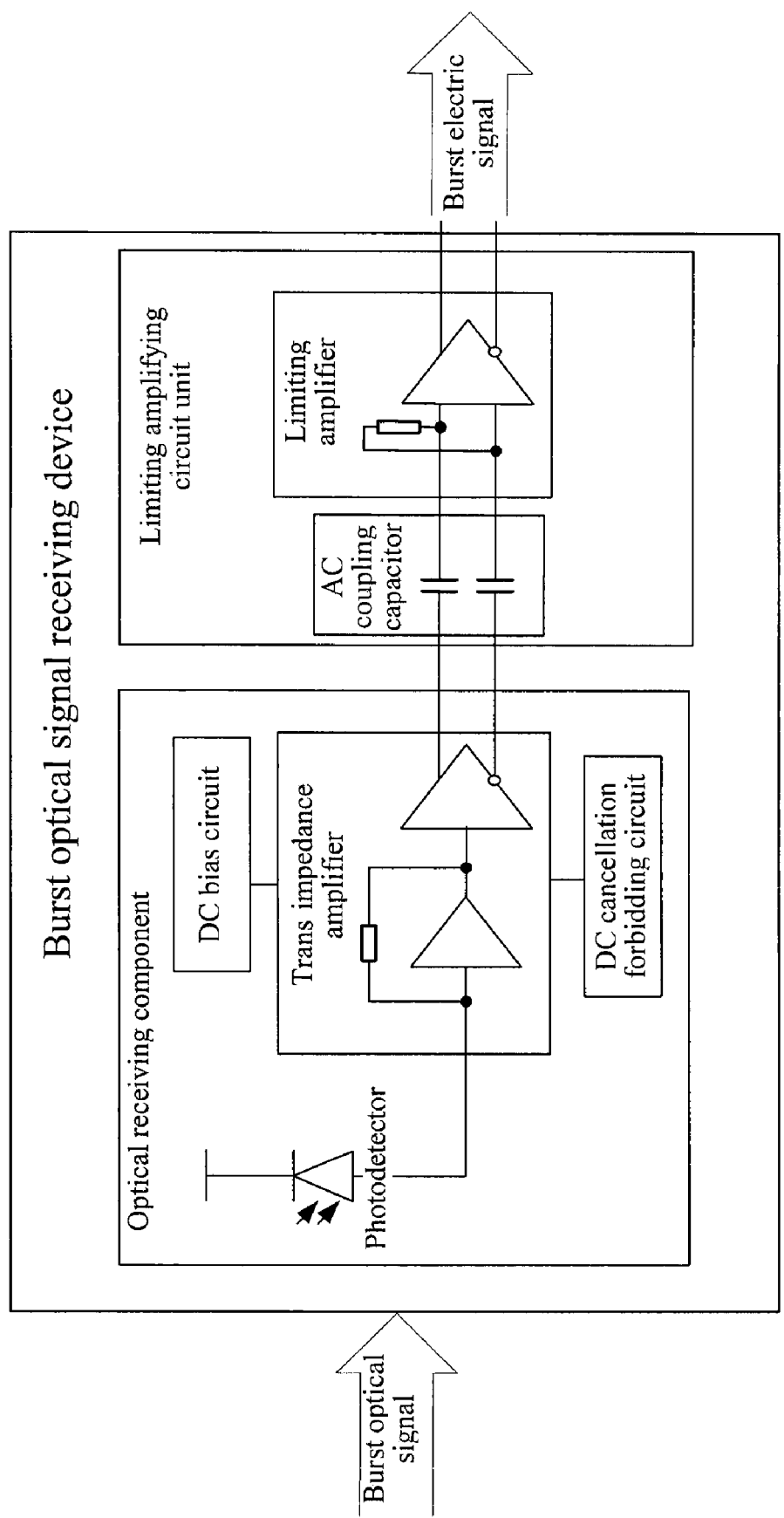
FIG. 1 is a schematic structural view of a burst optical signal receiving device according to the present invention.

FIG. 1 is a schematic structural view of a burst optical signal receiving device according to the present invention. As shown in FIG. 1, the burst optical signal receiving device includes an optical receiving component and a limiting amplifying circuit unit. The optical receiving component further includes a photodetector, a trans-impedance amplifier, a DC bias circuit, and a DC cancellation forbidding circuit, and the limiting amplifying circuit unit further includes a group of AC coupling capacitors, and a limiting amplifier capable of simultaneously amplifying a DC signal and an AC signal.

Specific connection relationships are described as follows.

An output end of the photodetector is connected with an input end of the trans-impedance amplifier, for converting a received burst optical signal into a burst current signal, and sending the burst current signal to the trans-impedance amplifier.

An output end of the DC cancellation forbidding circuit is connected with an enabling input end of a DC cancellation function of the trans-impedance amplifier, for forbidding the DC cancellation function of the trans-impedance amplifier.

An output end of the DC bias circuit is connected with a DC bias input end of the trans-impedance amplifier, for biasing a DC input by the trans-impedance amplifier to a proper working point, so as to widen a dynamic range of an input optical power.

An output end of the trans-impedance amplifier is connected with an input end of the AC coupling capacitor, for converting a received current signal into a differential voltage signal, and sending the differential voltage signal to the limiting amplifier for performing post-stage amplifying.

An output end of the AC coupling capacitor is connected with an input end of the limiting amplifier, for isolating a DC voltage between the output end of the trans-impedance amplifier and the input end of the limiting amplifier, and adjusting data recovery time by adjusting a capacitance value of the AC coupling capacitor.

The limiting amplifier amplifies an AC signal and a DC signal simultaneously. An output end of the limiting amplifier is used for outputting a burst differential voltage signal.

Figure 2:
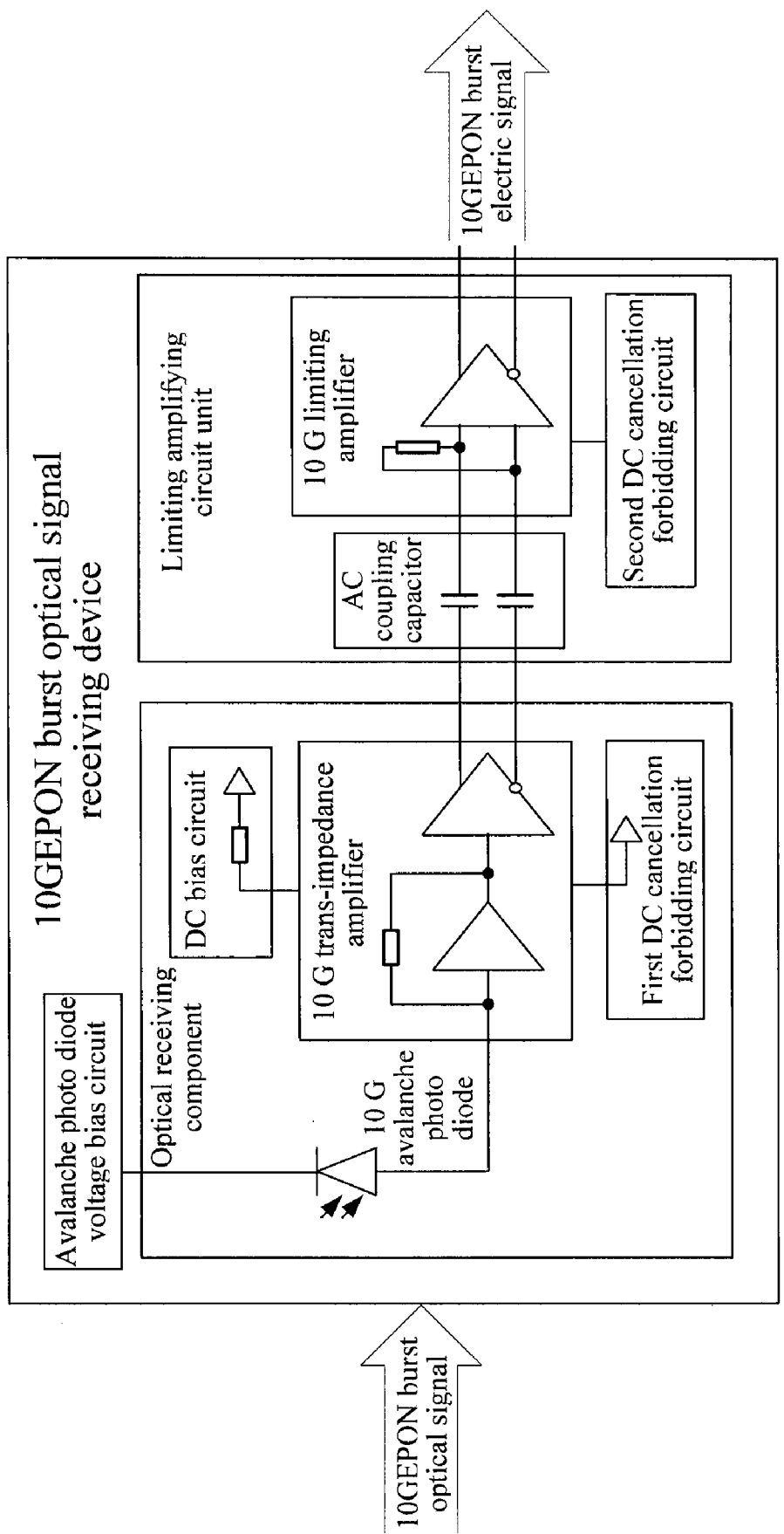
FIG. 2 is a schematic structural view of a 10GEPON burst optical signal receiving device applied to a 10GEPON according to an embodiment of the present invention.

FIG. 2 is a schematic structural view of a 10GEPON burst optical signal receiving device applied to a 10GEPON according to an embodiment of the present invention. As shown in FIG. 2, the 10GEPON burst optical signal receiving device includes an avalanche photo diode voltage bias circuit, an optical receiving component, and a limiting amplifying circuit unit. The optical receiving component further includes a 10 G avalanche photo diode, a 10 G trans-impedance amplifier, a DC bias circuit, and a first DC cancellation forbidding circuit, and the limiting amplifying circuit unit further includes AC coupling capacitors, a 10 G limiting amplifier, and a second DC cancellation forbidding circuit.

Specific connection relationships are described as follows.

An output end of the avalanche photo diode voltage bias circuit is connected with a power supply input end of the 10 G avalanche photo diode, for generating a bias voltage required by the 10 G avalanche photo diode.

An output end of the 10 G avalanche photo diode is connected with an input end of the 10 G trans-impedance amplifier, for converting a received 10GEPON upstream burst optical signal into a burst current signal, and sending the burst current signal to the 10 G trans-impedance amplifier.

An output end of the first DC cancellation forbidding circuit is connected with an enabling input end of a DC cancellation function of the 10 G trans-impedance amplifier. In this embodiment, if the enabling input end of the DC cancellation function of the 10 G trans-impedance amplifier is grounded, the DC cancellation function of the 10 G trans-impedance amplifier can be forbidden. It is noted that if the function is not forbidden, the DC bias circuit cannot work normally.

An output end of the DC bias circuit is connected with a DC bias input end of the 10 G trans-impedance amplifier, for biasing a DC input by the 10 G trans-impedance amplifier to a proper working point, so as to widen a dynamic range of an input optical power. In this embodiment, a DC bias current input by the 10 G trans-impedance amplifier can be adjusted through a resistor, and a resistance value of the resistor is smaller than 10 KΩ. In this embodiment, the resistor adopting the resistance value of 1 KΩ, 5 KΩ, or 10 KΩ can achieve the objective of the present invention. In a general case, preferably, the DC is biased adjacent to a start end of a linear amplifying region of the 10 G trans-impedance amplifier, and a difference between a DC bias current value and a current value of the start end of the linear amplifying region of the trans-impedance amplifier does not exceed 0.5 mA. In this embodiment, the DC bias current is −400 μA. An output end of the 10 G trans-impedance amplifier is connected with an input end of the AC coupling capacitor, for converting a received current signal into a differential voltage signal, and sending the differential voltage signal to the 10 G limiting amplifier for performing post-stage amplifying.

An output end of the AC coupling capacitor is connected with an input end of the 10 G limiting amplifier, for isolating a DC voltage between the output end of the 10 G trans-impedance amplifier and the input end of the 10 G limiting amplifier, and adjusting data recovery time by adjusting a capacitance value of the AC coupling capacitor. The group of AC coupling capacitors has 2 capacitors, and a capacitance value of each capacitor is greater than 100 pF and smaller than 4.7 nF. In the embodiment, the capacitor adopting the capacitance value of 100 pF, 1000 pF, or 4.7 nF respectively can realize effects of the present invention. In this embodiment, the capacitors and an input resistor of the 10 G limiting amplifier form an RC charging and discharging circuit, and charging-discharging time of the circuit determines the data recovery time of this embodiment. An output end of the second DC cancellation forbidding circuit is connected with an enabling input end of a DC cancellation function of the 10 G limiting amplifier, for forbidding the DC cancellation function of the 10 G limiting amplifier. In this embodiment, if the enabling input end of the DC cancellation function of the 10 G limiting amplifier is grounded, the DC cancellation function of the 10 G limiting amplifier can be forbidden.

An output end of the 10 G limiting amplifier is used for outputting a 10GEPON burst differential voltage signal to a post-stage burst clock data recovery apparatus.

A working process of the 10GEPON burst optical signal receiving device is described in detail hereinafter.

A 10GEPON upstream burst optical signal is converted into a burst current signal by a 10 G avalanche photo diode, the current signal is superposed with a DC bias current controlled by a DC bias circuit, next the superposed signal is amplified into a differential voltage signal by a 10 G trans-impedance amplifier, a DC voltage component is removed from the voltage signal after passing through the AC coupling capacitors, then the voltage signal continues to be amplified by the 10 G limiting amplifier into a differential voltage signal satisfying a certain digital level amplitude requirement, and the differential voltage signal is output from the 10GEPON burst optical signal receiving device.

In conclusion, the above description is merely the preferred embodiment of the present invention. However, the scope of the present invention is not limited thereto. Changes or replacements readily apparent to persons skilled in the prior art within the technical scope of the present invention should fall within the scope of the present invention.

What is claimed is:
1. A burst optical signal receiving device, comprising:
a photodetector;
a trans-impedance amplifier, having an enabling input end of a direct current (DC) cancellation function and a DC bias input end;
a group of alternating current (AC) coupling capacitors; and
a limiting amplifier having an enabling input end of a DC cancellation function;
wherein an output end of the photodetector is connected with an input end of the trans-impedance amplifier;

the enabling input end of the DC cancellation function of the trans-impedance amplifier is connected to a first DC cancellation forbidding circuit to disable the DC cancellation function of the trans-impedance amplifier;

the DC bias input end of the trans-impedance amplifier is grounded through a resistor;

one end of each of the group of AC coupling capacitors is directly connected with an output end of the trans-impedance amplifier respectively;

the other end of the AC coupling capacitor is connected with an input end of the limiting amplifier respectively;

the enabling input end of the DC cancellation function of the limiting amplifier is connected to a second DC cancellation forbidding circuit to disable the DC cancellation function of the limiting amplifier and an output end of the limiting amplifier outputs a burst differential voltage signal.

2. The burst optical signal receiving device according to claim 1, wherein the photodetector is a photo diode.

3. The burst optical signal receiving device according to claim 2, wherein the photo diode is an avalanche photo diode.

4. The burst optical signal receiving device according to claim 1, wherein a difference between a DC bias current value set by a DC bias circuit and a current value of a start end of a linear amplifying region of the trans-impedance amplifier does not exceed 0.5 mA.

5. The burst optical signal receiving device according to claim 1, wherein the group of AC coupling capacitors has 2 capacitors.

6. The burst optical signal receiving device according to claim 5, wherein a capacitance of the capacitor is greater than 100 pF and smaller than 4.7 nF.

7. The burst optical signal receiving device according to claim 1, wherein a resistance value of the resistor is smaller than 10 k Ohm.

8. The burst optical signal receiving device according to claim 1, wherein a connection manner of disabling the DC cancellation function of the trans-impedance amplifier is to ground the enabling input end of the DC cancellation function of the trans-impedance amplifier using the first DC cancellation forbidding circuit.

9. The burst optical signal receiving device according to claim 1, wherein the limiting amplifier amplifies an AC signal and a DC signal simultaneously.

10. The burst optical signal receiving device according to claim 1, wherein a connection manner of disabling the DC cancellation function of the limiting amplifier is to ground the enabling input end of the DC cancellation function of the limiting amplifier using the second DC cancellation forbidding circuit.

* * * * *